United States Patent
Shipps

(10) Patent No.: US 10,011,980 B1
(45) Date of Patent: Jul. 3, 2018

(54) FOUNDATION FLOOR SYSTEM AND ASSOCIATED TRANSPORT APPARATUS

(71) Applicant: Shipps Group, LLC, Gulf Shores, AL (US)

(72) Inventor: Peter Erickson Shipps, Gulf Shore, AL (US)

(73) Assignee: Shipps Group, LLC, Gulf Shores, AL (US)

(*) Notice: Subject to any disclaimer, the term of this patent is extended or adjusted under 35 U.S.C. 154(b) by 0 days.

(21) Appl. No.: 15/860,290

(22) Filed: Jan. 2, 2018

Related U.S. Application Data

(60) Provisional application No. 62/441,521, filed on Jan. 2, 2017.

(51) Int. Cl.
  *E04B 1/343* (2006.01)
  *E04B 5/10* (2006.01)
  *B60P 3/40* (2006.01)

(52) U.S. Cl.
  CPC ............ *E04B 1/34352* (2013.01); *B60P 3/40* (2013.01); *E04B 5/10* (2013.01); *E04B 2103/06* (2013.01)

(58) Field of Classification Search
  CPC .... E04B 1/34352; E04B 5/10; E04B 2103/06; B60P 3/40
  See application file for complete search history.

(56) References Cited

U.S. PATENT DOCUMENTS

| 3,505,767 | A | * | 4/1970 | Fyle, Jr. | ................ E04G 21/161 280/417.1 |
| 3,993,341 | A | * | 11/1976 | Bentley | .................... E04B 1/215 294/89 |
| 4,635,997 | A | | 1/1987 | Holt et al. | |
| 4,806,065 | A | | 2/1989 | Holt et al. | |
| 4,930,809 | A | * | 6/1990 | Lindsay | .................... B60P 3/32 280/789 |
| 5,246,241 | A | | 9/1993 | Baver | |
| 5,970,676 | A | * | 10/1999 | Lindsay | .............. E04B 1/34336 52/143 |
| 6,035,590 | A | * | 3/2000 | Lindsay | .............. E04B 1/34336 280/789 |
| 6,457,291 | B2 | * | 10/2002 | Wick | ..................... B62D 21/03 280/789 |

(Continued)

*Primary Examiner* — Rodney Mintz
(74) *Attorney, Agent, or Firm* — The Van Winkle Law Firm; William G. Heedy; David M. Carter

(57) ABSTRACT

A foundation floor system and associated transport apparatus for use in combination with a transport vehicle and an on-site foundation includes a frame, the frame including opposing I-beams each having an upper flange; a plurality of bar joists each extending perpendicularly between the opposing I-beams; each of the plurality of bar joists being in parallel alignment relative to each other and having first and second ends secured to corresponding ones of the opposing I-beams; first and second tube beams each being located interiorly adjacent to a respective one of the opposing I-beams beneath the upper flange, each of the first and second tube beams surrounding an end channel; and wherein the frame forms a surface that is sized and configured for receipt of a building structure; and a transport apparatus that is configured for transporting the frame thereon, and the transport apparatus including a tongue adapter and an axle adapter.

8 Claims, 6 Drawing Sheets

(56) References Cited

U.S. PATENT DOCUMENTS

| | | | | |
|---|---|---|---|---|
| 6,467,223 | B1* | 10/2002 | Christley | E04B 5/04 |
| | | | | 52/143 |
| 6,681,535 | B1 | 1/2004 | Bachelor | |
| 7,112,029 | B1 | 9/2006 | Neatherlin | |
| 8,662,525 | B1* | 3/2014 | Dierks | B62B 1/00 |
| | | | | 280/142 |
| 9,062,451 | B1 | 6/2015 | Wilson, Jr. et al. | |
| 9,422,013 | B2 | 8/2016 | Graham | |
| 9,908,453 | B2* | 3/2018 | McKibben | B60P 3/40 |
| 2001/0047634 | A1* | 12/2001 | Wick | B62D 21/03 |
| | | | | 52/653.1 |
| 2009/0160163 | A1* | 6/2009 | Gosselin | B60P 3/40 |
| | | | | 280/656 |
| 2011/0017113 | A1* | 1/2011 | Bruinekool | B63B 3/32 |
| | | | | 114/85 |
| 2015/0054256 | A1* | 2/2015 | Graham | B62D 53/061 |
| | | | | 280/441.2 |
| 2016/0114716 | A1* | 4/2016 | McKibben | B60P 3/40 |
| | | | | 280/407.1 |

* cited by examiner

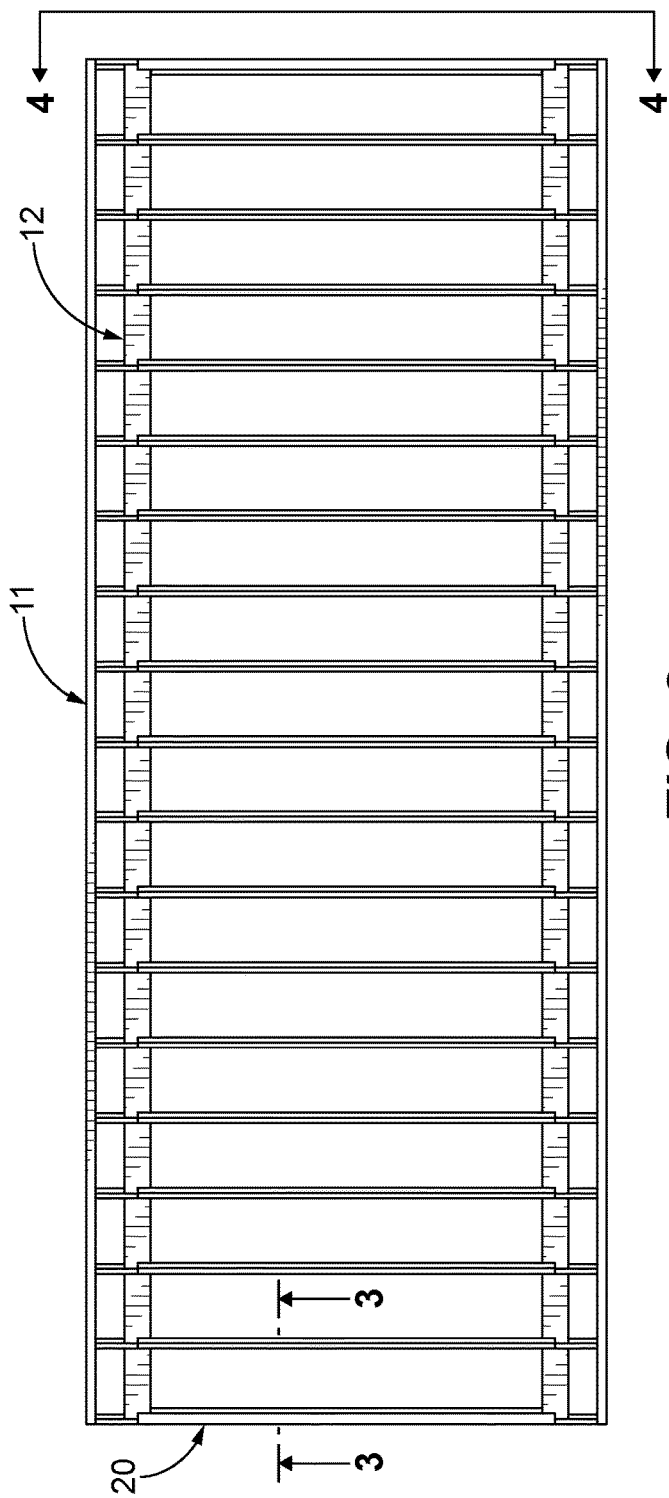
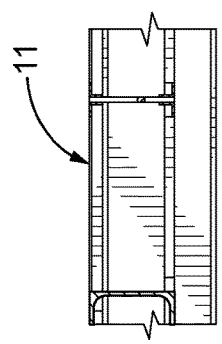
FIG. 2
FIG. 3

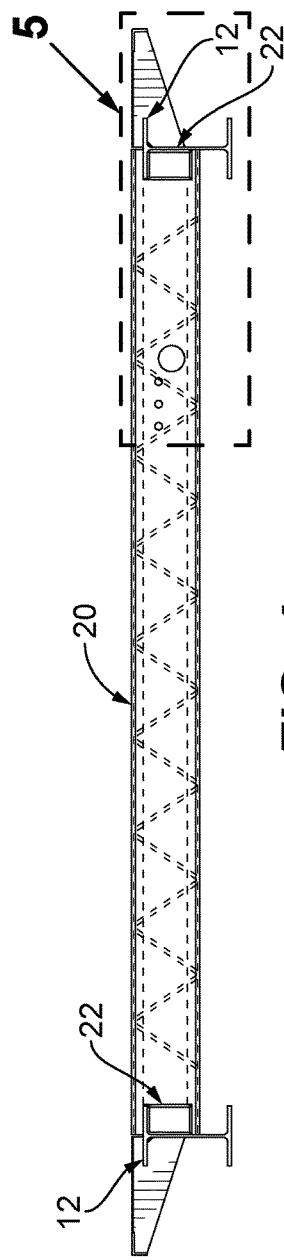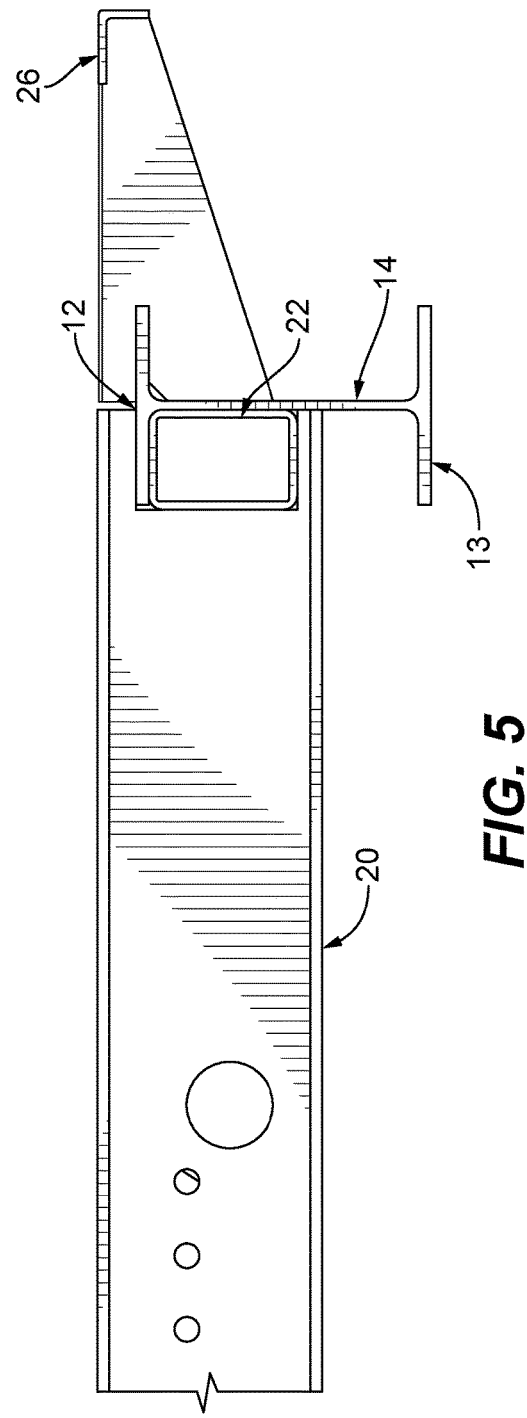

FOUNDATION FLOOR SYSTEM AND ASSOCIATED TRANSPORT APPARATUS

This application claims priority to and incorporates entirely by reference U.S. Provisional Patent Application Ser. No. 62/441,521 filed on Jan. 2, 2017.

BACKGROUND OF THE INVENTION

Field of the Invention

This invention relates to a system for coupling with a vehicle and including a transport apparatus and a foundation floor system for minimizing the height of a structure's frame during transport and, as a result, increasing the design height of the finalized structure.

Background of the Related Art

The U.S. Department of Transportation mandates that the maximum allowable height for a vehicle, trailer, or other transported structure be 13' 6" (4.1148 meters) above the road surface. This height limitation is a primary reason that a typical mobile home or park model R.V. has a low-pitched roof in relation to structures that are entirely built on-site.

A typical construction of mobile homes and park model RVs generally utilizes long structural steel beams, across which the floor joists are installed perpendicular to these beams. Finally, the floor decking is installed and the floor system is complete. This system can be anywhere from 16" to 22" in thickness. Then, in order to be transported, a set of axles is installed under the center of the frame, which raises the floor to a height of 36" to 42" above the road surface for transport. The resulting "Design Height" for the structure above the floor is thereby limited to 10' to 10'-6", causing the structure to have a relatively "squatty" appearance, which limits design options.

Traditional mobile home construction is very stringent on the weight of materials used in their construction. This translates downward to the required strength of the frame to support these loads. The goal of typical mobile home construction is ultimately to be at a reduced cost and weight as compared to other construction methods. Keeping weight to a minimum allows for the use of less expensive steel for the foundation frame. The result of this type of construction is that the frame will be somewhat "flexible". Moreover, tiny homes are traditionally built on an "equipment hauler" variety of trailer frame. These trailers are used to move heavy equipment like tractors, cars or other motor vehicles, and are individually rated for their maximum load, as mandated by several factors including the capacity of the steel in the frame, as well as the capacity and quantity of the axles under the trailer.

Lastly, traditional mobile frames are transported on a series of axles fastened to the underside of their frame. This adds height to the system, reducing the design height for the finalized home structure. Similarly, the tongue hitch of a mobile home is bolted to the underside of the frame, raising the front end of the unit off of the ground.

In view of the problems associated with presently available frame and associated transport systems, there is a need for a system for minimizing the height of a structure's frame, wherein the frame remains close to the ground or road surface during transport, and increasing the design height of the finalized structure.

Attempts have been made to overcome comparable problems, but such attempts, while useful for their intended purposes, have not provided an entirely suitable solution. For example, U.S. Pat. No. 6,681,535 to Batchelor discloses a mobile home transport dolly for connection with a lower support frame of a mobile home transported by the transport dolly, wherein the transport dolly includes an upper frame, a plurality of spaced apart load bearing transport wheels attached by a suspension system affixed to a lower aft end of the upper frame, at least one vertical spacing frame member affixed beneath a forward end of the upper frame, and a plurality of spaced apart coupling extensions affixed to the at least one vertical spacing frame member and extending forwardly therefrom, and attachment means securing the coupling extensions to an aft end of the mobile home lower support frame.

SUMMARY OF THE INVENTION

In accordance with one form of the present invention, there is provided a foundation floor system and associated transport apparatus for use in combination with a transport vehicle and an on-site foundation, the foundation floor system including a frame, the frame including opposing I-beams having a height of approximately twelve (12) inches and each of the opposing I-beams having an upper flange and a lower flange; a plurality of bar joists each extending perpendicularly between the opposing I-beams and having a plurality of web members extending therebetween; each of the plurality of bar joists being in parallel alignment relative to each other and having first and second ends secured to corresponding ones of the opposing I-beams; opposing header beams each extending between corresponding ends of the opposing I-beams; first and second tube beams each being located interiorly adjacent to a respective one of the opposing I-beams beneath the upper flange, each of the first and second tube beams surrounding an end channel; and wherein the frame forms a surface that is sized and configured for receipt of a building structure; first and second outriggers each being selectively securable to a respective one of the opposing I-beams for increasing the width of the surface; a saddle that is structured and disposed for connecting the frame to the on-site foundation, wherein the saddle includes a plurality of connecting members extending downwards from a base, and the base including a clamp for securing the lower flange of a respective one of the opposing I-beams; and a transport apparatus that is configured for transporting the frame thereon, the transport apparatus including a plurality of partitioned beams each being sized and configured for snuggly engaging the end channel of the first and second tube beams for supporting the frame during transport to the on-site foundation.

In accordance with another form of the present invention, there is provided a foundation floor system and associated transport apparatus for use in combination with a transport vehicle and an on-site foundation, the foundation floor system including a frame, the frame including opposing I-beams each having an upper flange; a plurality of bar joists each extending perpendicularly between the opposing I-beams; each of the plurality of bar joists being in parallel alignment relative to each other and having first and second ends secured to corresponding ones of the opposing I-beams; first and second tube beams each being located interiorly adjacent to a respective one of the opposing I-beams beneath the upper flange, each of the first and second tube beams surrounding an end channel; and wherein the frame forms a surface that is sized and configured for receipt of a building structure; a saddle that is structured and disposed for connecting the frame to the on-site foundation, wherein the saddle includes a plurality of connecting members extending downwards from a base, and the base including a clamp for securing the lower flange of a respective one of the opposing I-beams; and a transport apparatus that is configured for transporting the frame thereon, the transport apparatus including a plurality of partitioned beams each being sized and configured for snuggly engaging the end channel of the first and second tube beams for supporting the frame during transport.

In accordance with another form of the present invention, there is provided a foundation floor system and associated transport apparatus for use in combination with a transport vehicle and an on-site foundation, the foundation floor system including a frame, the frame including opposing I-beams each having an upper flange; a plurality of bar joists each extending perpendicularly between the opposing I-beams; each of the plurality of bar joists being in parallel alignment relative to each other and having first and second ends secured to corresponding ones of the opposing I-beams; first and second tube beams each being located interiorly adjacent to a respective one of the opposing I-beams beneath the upper flange, each of the first and second tube beams surrounding an end channel; and wherein the frame forms a surface that is sized and configured for receipt of a building structure.

BRIEF DESCRIPTION OF THE DRAWINGS

For a fuller understanding of the nature of the present invention, reference should be made to the following detailed description, taken in conjunction with the accompanying drawings in which:

FIG. 2 is a top plan view of the foundation frame;

FIG. 3 is a side elevational view of the foundation frame taken from line 3-3 in FIG. 2;

FIG. 4 is a front elevational view of the foundation frame taken from line 4-4 in FIG. 2;

FIG. 5 is an isolated front elevational view of the foundation frame taken from FIG. 4;

Like reference numerals refer to like parts throughout the several views of the drawings.

DETAILED DESCRIPTION OF THE PREFERRED EMBODIMENTS

Figure 1:
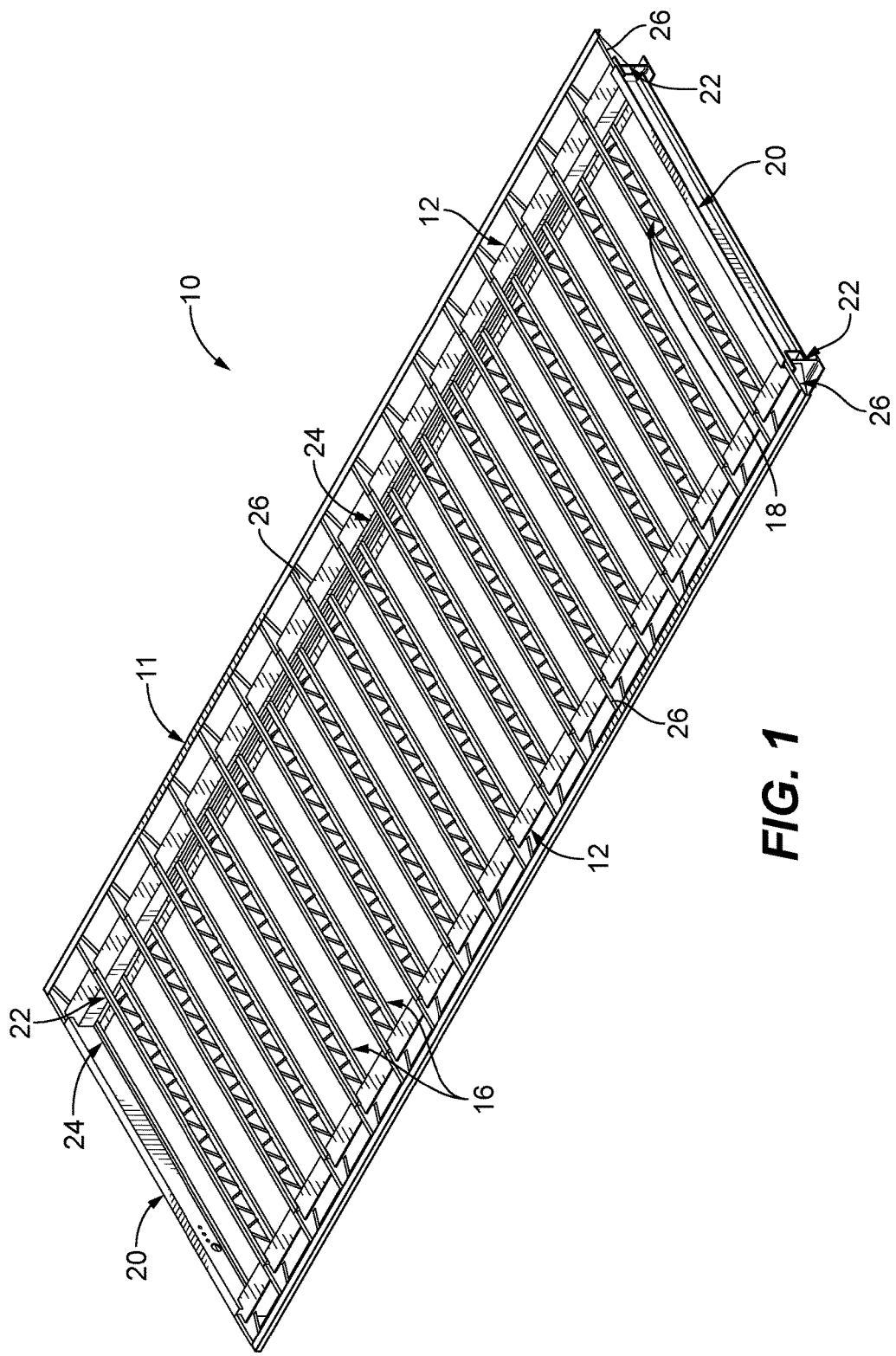
FIG. 1 is a perspective view of the foundation frame.

Referring to the several views of the drawings, the foundation frame system and transport apparatus of the present invention for use in combination with a vehicle 100 is shown and are generally indicated as 10 and 40, respectively.

Referring initially to FIGS. 1-5, the foundation frame system 10 is shown. Frame 11 includes upper flanges 12 and lower flanges 13 formed on opposing I-beams 14, wherein the upper flanges 12 form a surface that is sized and configured for receipt of a building structure. In one embodiment, the I-beams 14 have a height of approximately twelve inches. A plurality of bar joists 16 extend perpendicularly between the opposing I-beams 14 and include a plurality of web members 18 extending therebetween. Each of the plurality of bar joists 16 are in parallel alignment relative to each other and have first and second ends secured to corresponding ones of the opposing I-beams 14. Opposing header beams 20 extend between corresponding ends of the opposing I-beams 14. Referring specifically to FIGS. 4 and 5, first and second tube beams 22 are each located interiorly adjacent to a respective one of the opposing I-beams 14 beneath the upper flange 12. Each of the first and second tube beams 22 surround an end channel formed by the tube beams 22. Plate supports 24 are provided throughout the frame 11 for maintaining the structural integrity of the frame 11.

Still referring to FIGS. 1-5, in one embodiment, first and second outriggers 26 may be used for increasing the width of the surface of the frame 11. Each outrigger 26 may be selectively secured to a respective one of the opposing I-beams 14 for increasing the width of the surface.

Figure 6:
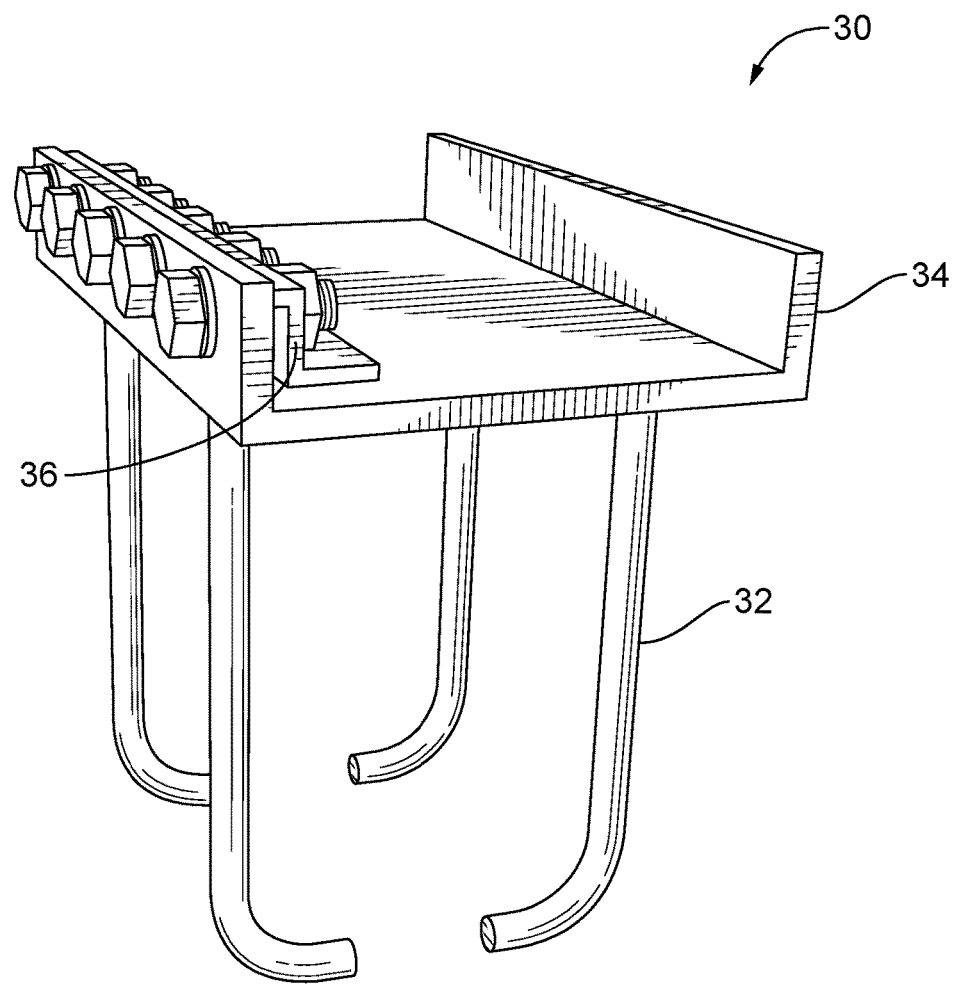
FIG. 6 is a perspective view of a saddle in accordance with one embodiment.

Referring now to FIG. 6, a saddle 30 is provided for connecting the frame 11 to the on-site foundation. The saddle 30 includes a plurality of connecting members 32 extending therefrom for connecting the saddle 30 with an on-site foundation pier. In one embodiment, as shown throughout the drawings, the connecting members 32 are prongs extending downwards from a base 34 for placement within an on-site foundation pier, which may be filled with concrete for securing the saddle 30 thereto. Other non-limiting embodiments of connecting members 32, such as a bolt-down configuration connecting member, may be used as well. The base 34 includes a clamp 36 for securing the lower flange 13 of a respective one of the opposing I-beams 14.

Figure 7:
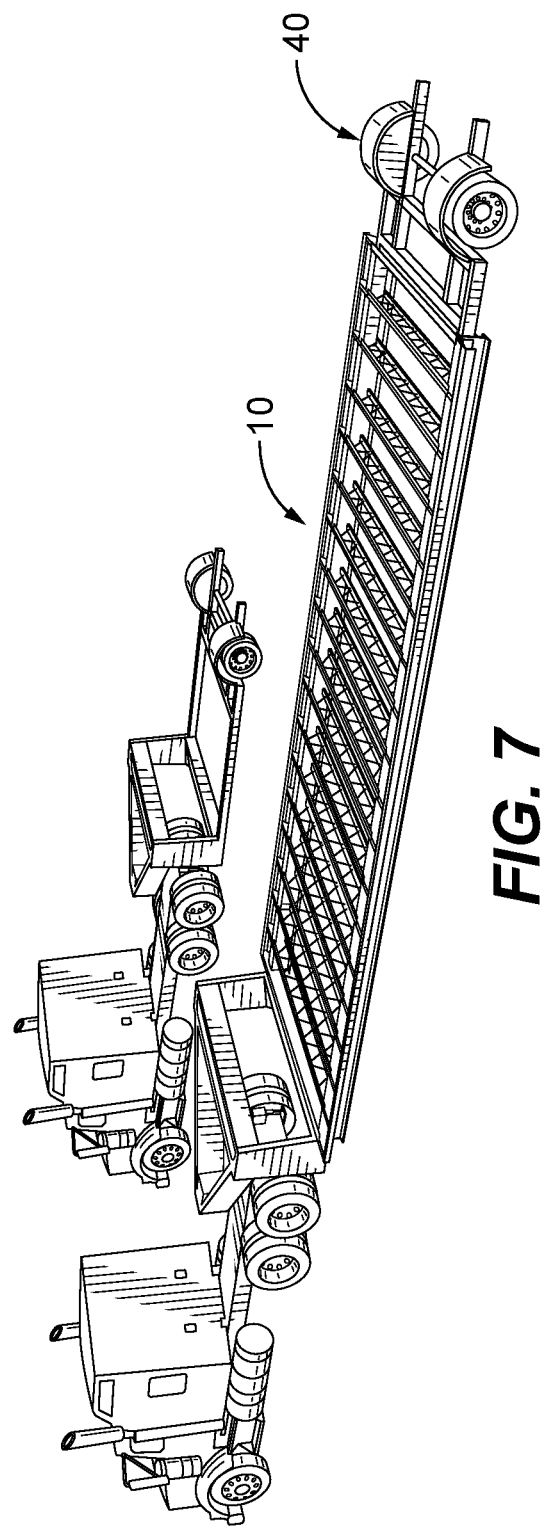
FIG. 7 illustrates perspective views of the transport apparatus secured to the foundation frame and the transport apparatus when not secured to a foundation frame.
Figure 8:
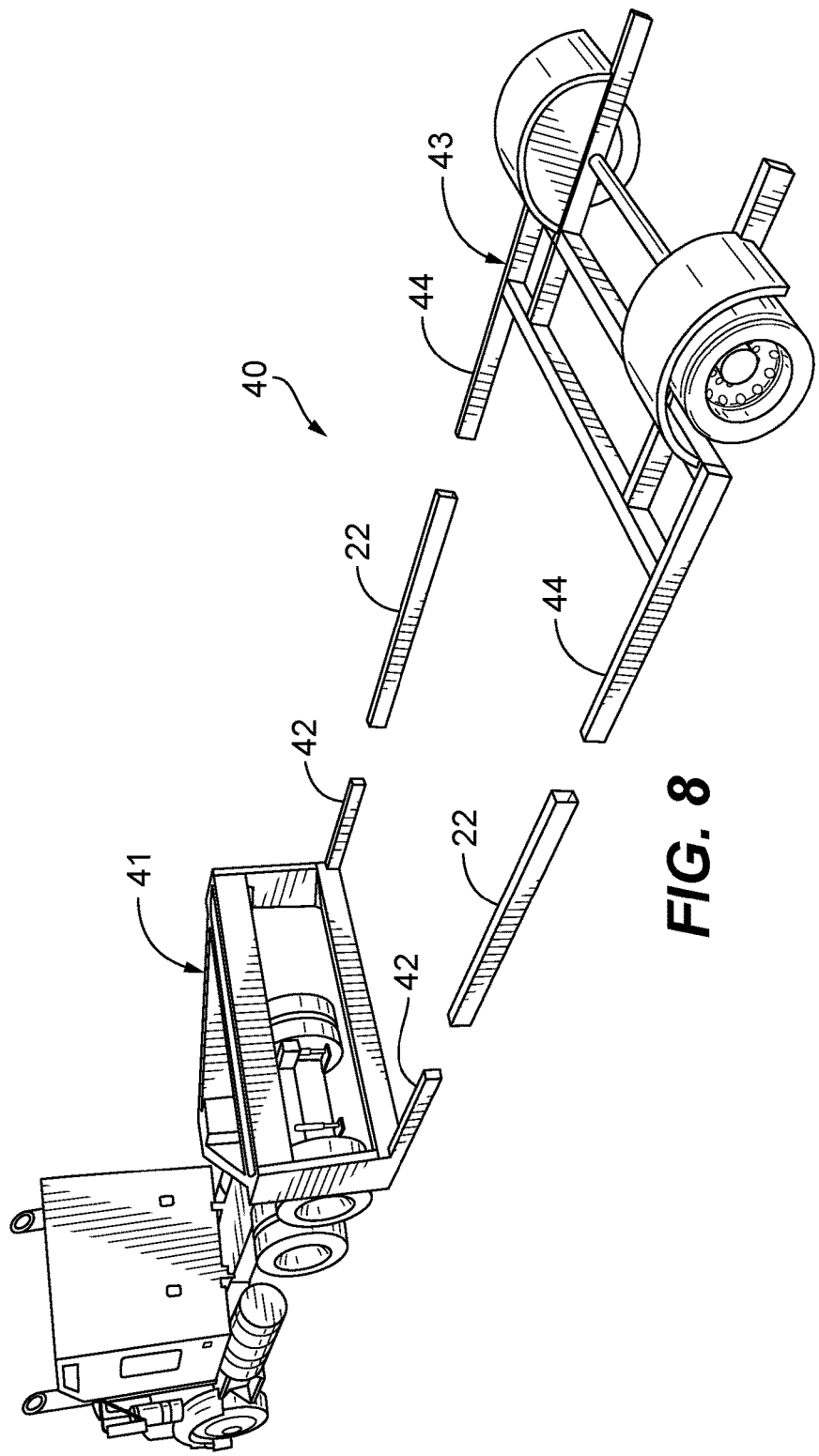
FIG. 8 is an exploded view shown in perspective of the transport apparatus.

Referring now to FIGS. 7 and 8, a transport apparatus 40 is provided for transporting the frame 11 thereon. The transport apparatus 40 generally includes a tongue adapter 41 including fork members 42 and an axle adapter 43 including fork members 44. Each set of fork members 42 and 44 are sized and configured for snuggly engaging the end channel of the first and second tube beams 22 for supporting the frame 11 during transport to the on-site foundation, and further provide the structural connection to be able to lift the frame 11. The fork members 42 and 44 may be locked into place with a steel pin to prevent inadvertent separation of the fork members 42 and 44 from the first and second tube beams 22. The combination of the tongue and axle adapters 41 and 43 raises the frame 11 off of the ground approximately 5 inches, which exceeds the Department of Transportation minimum of 4 inches, while maintaining the low-profile advantages of the frame 11. As shown specifically in FIG. 7, when a transport apparatus 40 is not transporting a frame 11, the tongue adapter 41 and axle adapter 43 connect to each other for transportation thereof.

The tongue adapter 41 may be designed to connect to a typical semi-truck's fifth wheel plate. The fifth wheel connection is considerably stronger than a typical "bumper pull" connection generally used by a typical mobile or modular home frame moving truck. Moreover, the fifth wheel connection is forward of the rear axles which greatly improves the turning radius and maneuverability of the frame. The axle adapter's axle is positioned so as to be behind the frame 11 as opposed to under the frame, which is generally the case. This configuration prevents the frame 11 from being raised above an axle and tires as would be the traditional position.

While the present invention has been shown and described in accordance with several preferred and practical embodiments, it is recognized that departures from the instant disclosure are contemplated within the spirit and scope of the present invention.

What is claimed is:

1. A foundation floor system and associated transport apparatus for use in combination with a building structure, a transport vehicle and an on-site foundation, said foundation floor system comprising:
a frame comprising:
opposing I-beams each having an upper flange and a lower flange;
a plurality of bar joists each extending perpendicularly between said opposing I-beams and having a plurality of web members extending therebetween;
each of said plurality of bar joists having first and second ends secured to corresponding ones of said opposing I-beams;
opposing header beams each extending between corresponding ends of said opposing I-beams;
first and second tube beams each being located interiorly adjacent to a respective one of said opposing I-beams beneath said upper flange, and each of said first and second tube beams surrounding an end channel; and
wherein said frame forms a transport surface that is sized and configured for receipt of the building structure;
a saddle that is structured and disposed for connecting said frame to the on-site foundation, wherein said saddle includes a plurality of connecting members having a plurality of prongs extending from a base, said prongs configured for placement within the on-site foundation, and the base including a clamp for securing the lower flange of a respective one of said opposing I-beams; and
the transport apparatus that is configured for transporting said frame thereon, and said transport apparatus including a tongue adapter and an axle adapter each including fork members being sized and configured for snuggly engaging opposing ends of the end channel of said first and second tube beams for supporting said frame during transport to the on-site foundation.

2. The foundation floor system and associated transport apparatus as recited in claim 1 wherein each of said opposing I-beams have a height of approximately twelve inches.

3. The foundation floor system and associated transport apparatus as recited in claim 1 wherein each of said plurality of bar joists being in parallel alignment relative to each other.

4. The foundation floor system and associated transport apparatus as recited in claim 1 further comprising first and second outriggers each being selectively securable to a respective one of said opposing I-beams for increasing a width of the transport surface.

5. A foundation floor system and associated transport apparatus for use in combination with a building structure, a transport vehicle and an on-site foundation, said foundation floor system comprising:
a frame comprising:
opposing I-beams each having an upper flange and a lower flange;
a plurality of bar joists each extending perpendicularly between said opposing I-beams and having a plurality of web members extending therebetween;
each of said plurality of bar joists being in parallel alignment relative to each other and having first and second ends secured to corresponding ones of said opposing I-beams;
opposing header beams each extending between corresponding ends of said opposing I-beams;
first and second tube beams each being located interiorly adjacent to a respective one of said opposing I-beams beneath said upper flange, and each of said first and second tube beams surrounding an end channel; and
wherein said frame forms a transport surface that is sized and configured for receipt of the building structure;
a saddle that is structured and disposed for connecting said frame to the on-site foundation, wherein said saddle includes a plurality of connecting members having a plurality of prongs extending from a base, said prongs configured for placement within the on-site foundation, and the base including a clamp for securing the lower flange of a respective one of said opposing I-beams; and
the transport apparatus that is configured for transporting said frame thereon, and said transport apparatus including a tongue adapter and an axle adapter each including fork members being sized and configured for snuggly engaging opposing ends of the end channel of said first and second tube beams for supporting said frame during transport to the on-site foundation.

6. The foundation floor system and associated transport apparatus as recited in claim 5 wherein each of said opposing I-beams have a height of approximately twelve inches.

7. The foundation floor system and associated transport apparatus as recited in claim 5 further comprising first and second outriggers each being selectively securable to a respective one of said opposing I-beams for increasing a width of the transport surface.

8. A foundation floor system and associated transport apparatus for use in combination with a building structure, a transport vehicle and an on-site foundation, said foundation floor system comprising:
a frame comprising:
opposing I-beams having a height of approximately twelve inches and each of said opposing I-beams having an upper flange and a lower flange;
a plurality of bar joists each extending perpendicularly between said opposing I-beams and having a plurality of web members extending therebetween;
each of said plurality of bar joists being in parallel alignment relative to each other and having first and second ends secured to corresponding ones of said opposing I-beams;
opposing header beams each extending between corresponding ends of said opposing I-beams;
first and second tube beams each being located interiorly adjacent to a respective one of said opposing I-beams beneath said upper flange, and each of said first and second tube beams surrounding an end channel; and
wherein said frame forms a transport surface that is sized and configured for receipt of the building structure;
first and second outriggers each being selectively securable to a respective one of said opposing I-beams for increasing a width of the transport surface;
a saddle that is structured and disposed for connecting said frame to the on-site foundation, wherein said saddle includes a plurality of connecting members having a plurality of prongs extending from a base, said prongs configured for placement within the on-site foundation, and the base including a clamp for securing the lower flange of a respective one of said opposing I-beams; and the transport apparatus that is configured for transporting said frame thereon, and said transport apparatus including a tongue adapter and an axle adapter each including fork members being sized and configured for snuggly engaging opposing ends of the end channel of said first and second tube beams for supporting said frame during transport to the on-site foundation.

\* \* \* \* \*